APPARATUS FOR CAMOUFLAGING COMMUNICATION SIGNALS

Filed Nov. 9, 1959 8 Sheets-Sheet 1

Inventor
Gustav Guanella
By Pierce, Scheffler & Parker
Attorneys

Feb. 12, 1963 G. GUANELLA 3,077,518

APPARATUS FOR CAMOUFLAGING COMMUNICATION SIGNALS

Filed Nov. 9, 1959 8 Sheets-Sheet 2

Inventor

Gustav Guanella

By Pierce, Scheffler & Parker

Attorneys

Feb. 12, 1963 G. GUANELLA 3,077,518

APPARATUS FOR CAMOUFLAGING COMMUNICATION SIGNALS

Filed Nov. 9, 1959 8 Sheets-Sheet 3

Inventor

Gustav Guanella

By Pierce, Scheffler & Parker

Attorneys

| $a_1$ | $a_2$ | A | B | C | D | E |
|---|---|---|---|---|---|---|
| + | + | + | + | + | + | + |
| + | 0 | 0 | + | 0 | + | M |
| + | − | − | 0 | 0 | M | M |
| 0 | + | 0 | + | 0 | + | M |
| 0 | 0 | 0 | 0 | 0 | M | M |
| 0 | − | 0 | − | 0 | − | M |
| − | + | − | 0 | 0 | M | M |
| − | 0 | 0 | − | 0 | − | M |
| − | − | + | − | − | − | − |

Inventor
Gustav Guanella
By Pierce, Scheffler & Parker
Attorneys

Inventor:
Gustav Guanella
By Pierce, Scheffler & Parker
Attorneys

Feb. 12, 1963 G. GUANELLA 3,077,518

APPARATUS FOR CAMOUFLAGING COMMUNICATION SIGNALS

Filed Nov. 9, 1959 8 Sheets-Sheet 6

Inventor
Gustav Guanella
By Pierce Scheffler & Parker
Attorneys

Feb. 12, 1963 G. GUANELLA 3,077,518

APPARATUS FOR CAMOUFLAGING COMMUNICATION SIGNALS

Filed Nov. 9, 1959 8 Sheets-Sheet 7

Inventor

Gustav Guanella

By Pierce Scheffler & Parker

Attorneys

Feb. 12, 1963 G. GUANELLA 3,077,518

APPARATUS FOR CAMOUFLAGING COMMUNICATION SIGNALS

Filed Nov. 9, 1959 8 Sheets-Sheet 8

Inventor

Gustav Guanella

By Pierce, Scheffler & Parker

Attorneys

United States Patent Office 3,077,518

Patented Feb. 12, 1963

3,077,518

APPARATUS FOR CAMOUFLAGING COMMUNICATION SIGNALS

Gastav Guanella, Zurich, Switzerland, assignor to Patelhold Patentverwertungs- & Elektro-Holding A.-G., Glarus, Switzerland Filed Nov. 9, 1959, Ser. No. 851,675

Claims priority, application Switzerland Dec. 10, 1958

7 Claims. (Cl. 179—1.5)

There are two principally different groups of methods for camouflaging communication signals. In the methods of the first group, the signal to be transmitted is divided on the transmitter side into successive elements, or into elements with directly adjoining frequencies, which are then transmitted to the receiver, in an order differing from the original order, where they are ordered again. These methods yield only a limited security against un-cal expenditure; in voice signals to be sure because the authorized monitoring, despite a relatively great techni- amplitude fluctuations, which are characteristic of these signals, are maintained. In the methods of the second group, the signal to be transmitted is mixed on the transmitter side with an additional signal to conceal the time slope of the communication signal, thus making it unrecognizable. On the receiver side the communication signal is then separated again from the additional signal. The additional signal can be obtained on the transmitter and receiver side from one signal source each, which are synchronized. It is difficult in this case to maintain the synchronism in case of transmission trouble. Besides, the avoidance of repetitions in the time slope of the additional signal, which would facilitate unauthorized monitoring, requires the use of storage units for long programs, and thus a considerable expenditure. The additional signal produced on the transmitter side can also be transmitted to the receiver over a separate channel, if necessary after camouflaging. Finally, a relatively simple control signal can be produced on the transmitter side and transmitted to the receiver, the complicated additional signal being produced by identical means on the transmitter and receiver side.

The invention relates also to a system where the additional signals required on the transmitter and receiver side are obtained from a control signal available at both places. The object of the invention is to produce additional signals with a time slope which offers practically absolute security against unauthorized monitoring, even if the control signal is known, a true-to-form agreement of the additional signal on the receiver side with the signal on the transmitter side being ensured, even in the case of variations of the operating voltages and similar troubles.

The improved secret signalling apparatus in accordance with the present invention comprises a first pulse series modulated by an intelligence signal. Means are provided at the transmitting station for generating a control pulse series of arbitrarily varying polarity which are thereafter converted by a program converter in the form of logical circuit means into an additional pulse series having polarities in dependence upon the polarities of several previously occurring pulses of the control pulse series. The first pulse series and the additional pulse series are then combined at the transmitting station to form a composite pulse series. The control pulse series and the composite pulse series are then sent from the transmitting station to the receiving station where means identical with those at the transmitting station produce a second and identical additional pulse series which is then applied to the composite pulse series to reconvert the latter into the first pulse series. The generation of the additional pulse series is effected in this way that a parameter of each additional signal impulse (for example, the impulse height or the time position of an impulse edge) is influenced in dependence on the properties of a plurality of preceding control signal impulses. Such an additional signal in the form of an impulse is particularly suitable for camouflaging a communication signal, likewise in the form of an impulse, the impulses modulated with the communication signal appearing at the same time as the additional signal impulses and being mixed with the latter, for example, by addition or multiplication.

Mixing by multiplication is particularly suitable for communication signals which have the form of impulses of variable polarity. The polarity of these impulses is then reversed in dependence on the polarity of the impulses of the additional signal.

Various embodiments of the invention are shown in the accompanying drawings and will be described below in further detail.

Figure 1:
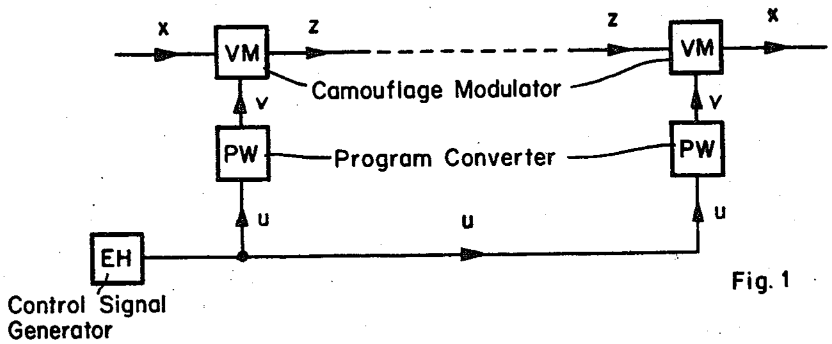
FIGS. 1 and 2 are block schematic diagrams showing two different forms of communication systems embodying the inventive concept.

With reference now to the drawings, and to FIG. 1 in particular, a communication signal $x$ in the form of an impulse is to be camouflaged and transmitted from the site of transmission (left) to the site of reception (right). This signal is mixed in the camouflage-modulator VM on the transmitter side with the additional signal $v$, which has also the form of an impulse, and the signal $z$, resulting from this mixture, is fed to the receiver, where the communication signal is separated from the additional signal $v$ by an identical modulator VM. The additional signal $v$ is produced on the transmitter and receiver side by a program converter PW according to identical rules from the control signal $u$, which has also the form of an impulse. The control signal originates from the generator EH installed on the transmitter side and is fed to the transmitter and receiver arrangement for which a special transmission channel is used in the represented example.

In the production of the control signal one can start, for example, from a noise potential whose instantaneous values appearing at certain times influence a parameter of the control signal impulses.

In a variation of the arrangement shown in FIG. 1 the generator EH can naturally also be installed on the receiver side or in any suitable place; it can also be placed centrally and provide several communication transmitting plants simultaneously with the control singal.

Figure 2:
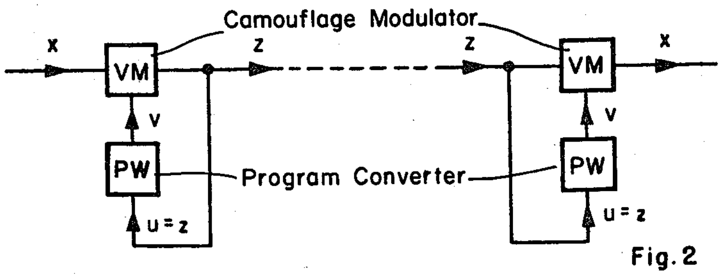

According to FIG. 2 the signal $z$, produced by mixing the communication signal $x$ with the additional signal $v$, is used as a control signal $u$, if necessary after transformation into a sequence of modulated impulses. Correspondingly this signal itself is fed to the program converter PW on the transmitter and receiver side.

The method of operation of the program converter will be described on the basis of FIGS. 3 and 4, which generate the additional signal $v$ from the control signal $u$. These program converters, built for example, in the manner of logical circuits, e.g. digital computers, generate an impulse sequence, one parameter of each impulse depending on the parameters of a plurality of preceding impulses of the control signal. The above mentioned impulse sequence serves directly or after additional transformations as an additional signal. Preferably identical devices are used on the transmitter and receiver side for the generation of the additional signal from the control signal.

Figure 3:
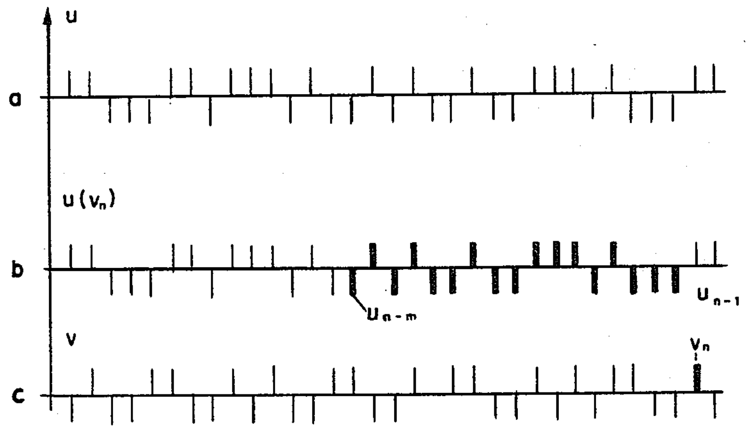
FIGS. 3 and 4 are graphs showing the method of operation of the program converter component of the system.
Figure 4:
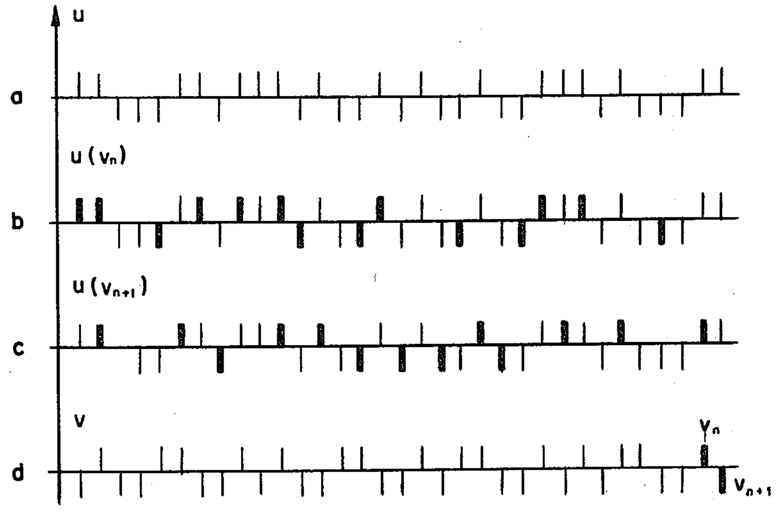

In FIGS. 3 and 4 it has been assumed that the control signal $u$ (line $a$) consists of a sequence of short impulses of uniform shape whose polarity are changed as a matter of chance. The output impulse sequence $v$ (line $c$) of the program converter is also composed, in the represented examples, of impulses of uniform shape, whose polarity is determined by the polarity of several preceding control signal impulses.

According to FIG. 3 the polarity of the impulses $v_n$ is determined by the polarities of $m$ successive preceding impulses of the sequence $u$; in the represented example, $m$ equals seventeen and in line $b$ the seventeen decisive impulses of the sequence $u$ have therefore been marked by thick lines. Among them are seven positive and ten negative impulses.

According to the embodiment in FIG. 4 the polarity of the impulses $v$ is determined by the polarities of several preceding impulses of the sequence $u$ which do not follow each other immediately, however, and whose selection and number must not be the same for each impulse $v_n$. In the represented example the polarity of the impulse $v_n$ is given by the product of the polarities of the series of fourteen impulses of the sequence $u$ marked in line $b$ by thick lines (eight positive, six negative, $v_n$ consequently positive), the polarity of the impulses $v_{n+1}$ by the product of the polarities of the series of thirteen impulses of the sequence $u$ marked in line $c$ (eight positive, five negative, $v_{n+1}$ consequently negative).

In order to ensure the secrecy of the camouflage, the number of impulses of the sequence $u$, which are determinant for the polarity of the impulses $v$, must be selected sufficiently high. If the determinant group comprise $m$ impulses, there are, for example in the method according to FIG. 3, $2^m$ different possible forms for this group. In order to render unauthorized decoding difficult, repetitions of the forms should be relatively rare. The probability of repetitions drops with the number of possible forms, that is, exponentially with increasing $m$. A numerical example will show the suitable order of magnitude for $m$. For camouflaging a voice signal, an additional signal with about 10,000 impulses per second seems expedient. If $m$ equals 30, there are $2^{30}$ or about $10^9$ different forms available for the determinant group. The one-time course of all these forms takes about $10^5$ seconds or about 28 hours. Only after this time has elapsed can a repetition of forms be expected with great probability.

FIGS. 5–13 show examples for the construction of program converters PW according to the invention.

Figure 5:
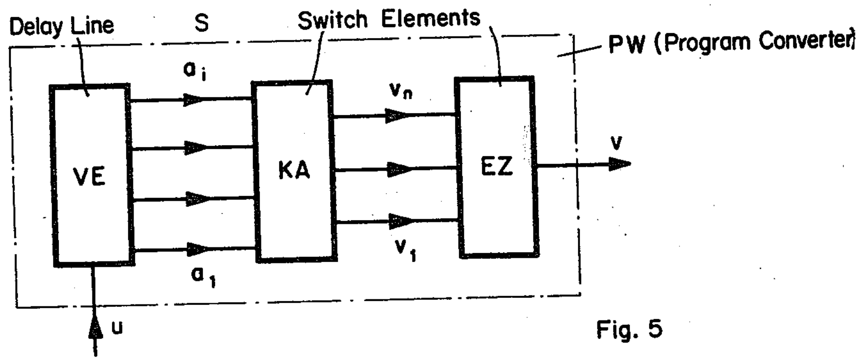
FIGS. 5–13 are block schematic diagrams illustrating various embodiments of the program converter component.

In an arrangement according to FIG. 5, which works according to the method of FIG. 3, the control signal $u$ is carried over a delay line VE with several taps at which the preceding impulses $a_1$ to $a_l$ can be tapped at any time. These impulses, which need not necessarily be directly adjoining in the control signal, represent the determinant group for the polarity of the output impulse $v$. A first switch element KA forms the signals $v_1$ to $v_n$ from a number of impulses selected from the group $a_1$ to $a_l$, a second switch element EZ forms the signal $v$ from the impulses $v_1$ to $v_n$. In a simpler version, the switch element EZ may be dispensed with, the switch element KA forming directly the signal $v$.

If such an arrangement is to work according to the method in FIG. 4, where the number of impulses and their position within the determinant group is not constant, switch elements can be provided which are also actuated by the control signal $u$ and which permute the connections between the taps of the delay line VE and the first switch element KA according to any fixed program. The number of taps can also be greater in this case than the number of inputs of the first multiplier.

Figure 6:
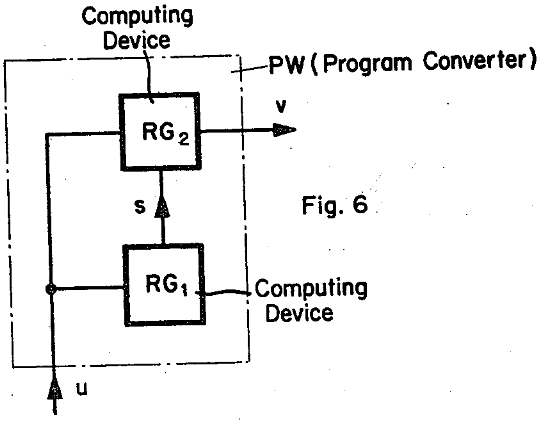

In general, such a method of operation can be described on the basis of the block diagram in FIG. 6. The program computing device $RG_2$ generates, from the control signal, the signal $v$ which, if necessary after additional transformation, serves as an additional signal. The program according to which the generation is effected is changed at certain times by the computing device $RG_1$, which in turn is actuated likewise by the control signal $u$.

Figure 7:
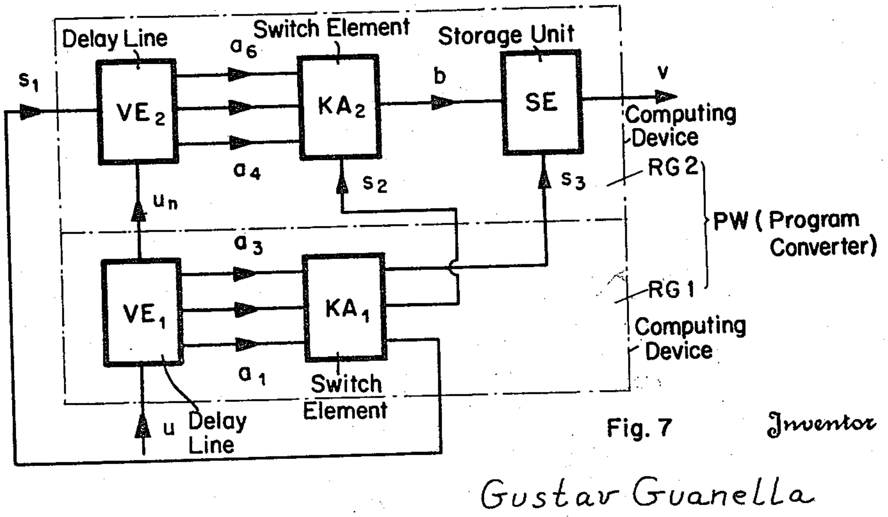

FIG. 7 shows a detailed example for such a program converter. The control signal $u$ traverses the delay line $VE_1$ of the computing device $RG_1$ and subsequently (as signal $u_n$) the delay line $VE_2$ of the program computing device $RG_2$ proper. From the impulses $a_4$ to $a_6$ taken from this delay line, the switch element $KA_2$ generates the impulse sequence $b$. Reversal of the polarity is effected at a certain point of the delay line $VE_2$ by a signal $s_1$, a variation of the function mode of $KA_2$, for example, in the sense of a polarity reversal of the impulses $b$, can be effected by a signal $s_2$. The signals $s_1$ and $s_2$ are generated by a switch element $KA_1$ which is connected on the input side with taps of the delay line $VE_1$ and which is therefore also actuated by the control signal $u$. The above mentioned switch element generates, in the represented example, a third signal $s_3$ which influences the program of the storage unit SE in the same sense that the sequence of the issuing impulses $v$ no longer agrees with the sequence of the stored impulses $b$.

Figure 8:
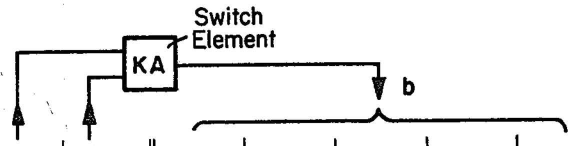

When designing the switch elements designated by KA in FIG. 7 and other figures, use can be made of the numerous possibilities, known in themselves, of the technology of logical circuits and electronic computers. Some function modes or programs which can be realized with simple logical circuits, are shown in FIG. 8. According to one of the various programs A to E, output quantities $b$ are generated from only two input quantities $a_1$, $a_2$ (for example, from the existence and polarity of two impulses. According to program A, the product of the input quantities is formed; according to program B, an impulse with the sign of the sum of the input impulses is formed; according to program C, an output impulse of the corresponding polarity is only generated when both input impulses have the same polarity; according to program D, the output quantity has the sign of the sum of the input impulses, but if this sum is zero, the output quantity remains at the value it had immediately before (positions M); finally according to program E, the output quantity is only polarized by input impulses of equal polarity; in all other combinations of polarities of the input impulses, it remains at the value it occupied before (positions M).

Figure 9:
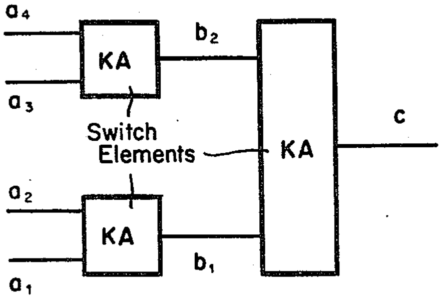

According to FIG. 9, several switch elements KA, each of which generates an output quantity from two input quantities, can be combined to a program converter as shown in FIG. 5. Thus inputs $a_1$, $a_2$ generate output $b_1$ and inputs $a_3$, $a_4$ generate output $b_2$. Outputs $b_1$ and $b_2$ are then combined to generate output C. Depending on the selection of the possibilities for each individual switch element shown in FIG. 8, there are numerous possibilities for the relation of the output quantity $c$ with the input quantities $a_1$ to $a_4$. The number of possibilities can be further increased, for example, by the application of coincidence circuits. These can be so designed that output impulses can only appear or change their sign when the input impulses have a certain sign combination.

Figure 10:
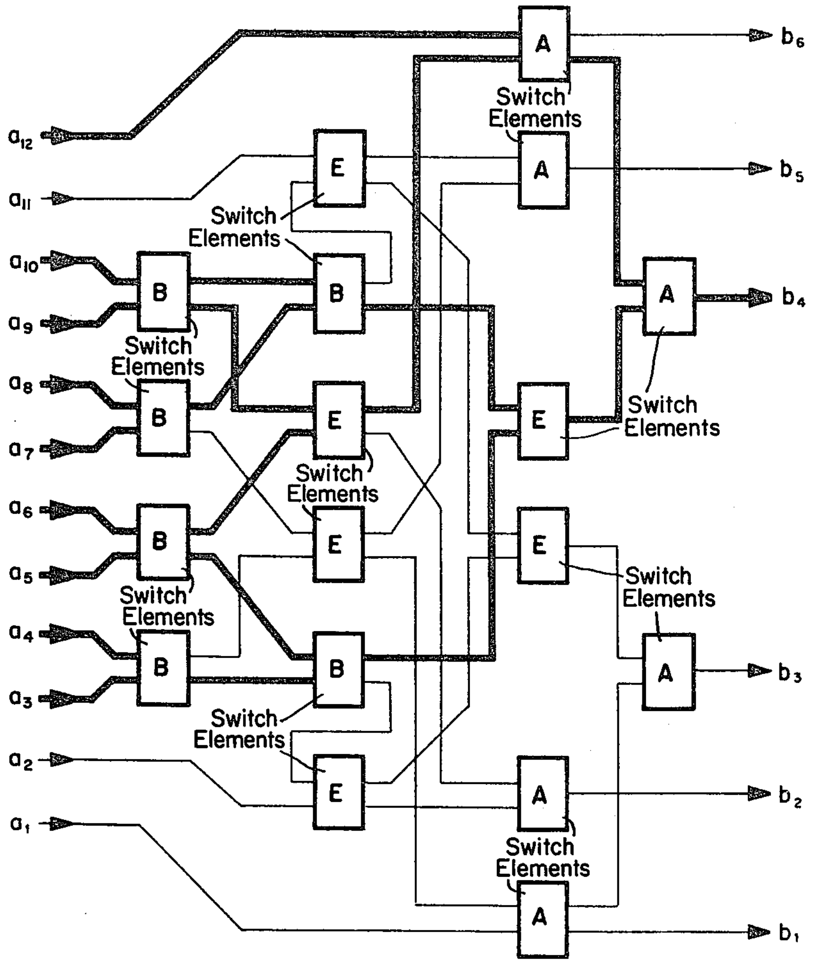

FIG. 10 shows, from the great number of possibilities, a combination of switch elements, each of which works in accordance with the fed letter A, B or E according to the program with the same letter. Each switch element uses two input quantities for each output quantity. Altogether six output signals $b_1$ to $b_6$ are generated according to different programs from twelve input signals $a_1$ to $a_{12}$. The input signals can be obtained by means of a delay line from the control signal; the output signals can be combined in any desired manner with the additional signal, for example, in this way that the signal $b_4$ takes over the part of signal $b$ in FIG. 7 and the other signals the parts of the signals $s$ in FIG. 7.

Figure 11:
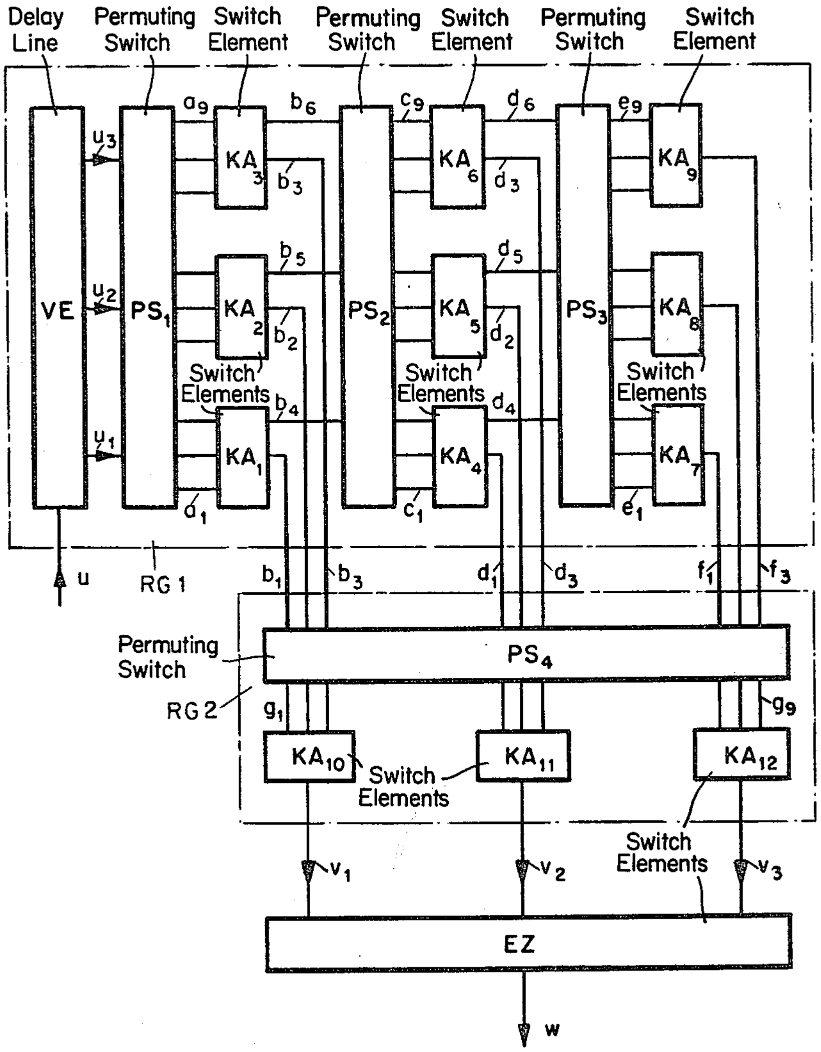

Another example for a program converter is shown in FIG. 11. The control signal $u$ traverses the delay line VE. Over permuting switches $PS_1$, which can be adjusted by hand or automatically according to the given program, the signals $u$ tapped from the taps of the delay line are fed as input quantities $a_1$ to $a_9$, to the switch elements $KA_1$, $KA_2$ and $KA_3$. The output quantities of the above mentioned switch elements reach over permuting switches $PS_2$ and $PS_4$ additonal switch elements $KA_4$, $KA_5$, and $KA_6$ and $KA_{10}$, $KA_{11}$ and $KA_{12}$ respectively. To the last mentioned permuting switches are also fed additional signals $d_1$, $d_2$, $d_3$, $f_1$, $f_2$, $f_3$, which originate from the switch elements $KA_4$, $KA_5$ and $KA_6$ and from the switch elements $KA_7$, $KA_8$ and $KA_9$, respectively which are connected with them over the permuting switch $PS_3$. The impulse sequence $v_1$, $v_2$ and $v_3$ thus depend according to different adjustable programs on the control signal $u$ and is further combined by the switch element EZ to form the additional signal $v$.

Figure 12:
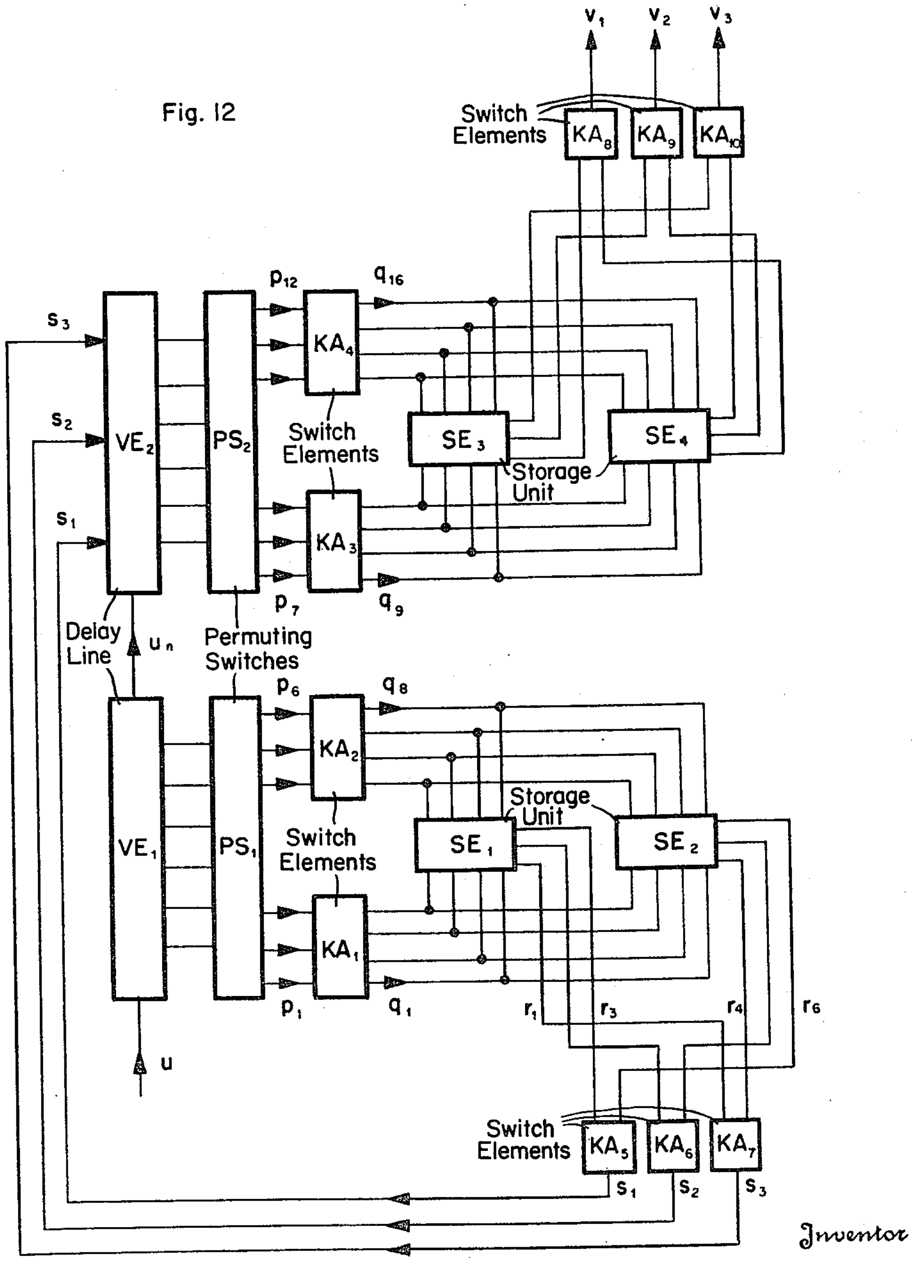

In the program converter according to FIG. 12, the control signal $u$ approximately in the form of FIG. 3, traverses the delay line $VE_1$ which is composed of $n$ steps. The storage time of each step corresponds to an impulse interval. At the output of the individual steps are tapped signals which are thus delayed by an integral multiple of an impulse interval; these signals are fed to the permuting switch $PS_1$. The latter exchanges the signals according to a pre-arranged program and yields, for example, six signals ($p_1$ to $p_6$). The control signal $u_n$, which is delayed in $VE_1$, reaches a second delay line $VE_2$. The permuting switch $PS_2$ generates from its output signals likewise six signals ($p_7$ to $p_{12}$).

The switch elements $KA_1$ to $KA_4$, which have three inputs each and four outputs, are so designed that, depending on the sign combination of the simultaneously appearing input impulses, one output impulse is generated on one of the output lines. The storage units $SE_1$ to $SE_4$, which have each two groups of four inputs each, contain several storage elements, of which one is excited depending on the combination of the two impulses arriving simultaneously in one group each. The individual storage elements of each storage unit are thus excited successively in irregular sequence. The excited state is maintained in each element until the next excitation. Each of the output lines $r_1$ to $r_3$ is conducted through all storage elements of storage unit $SE_1$, so that a new excitation of each storage element effects a positive or negative output impulse on this line. The three output lines $r_1$ to $r_3$ are associated with the individual storage elements with different polarity, so that a certain excitation of the $m$th storage element, for example, yields positive output impulses on the lines $r_1$, $r_2$ and a negative output impulse on the line $r_3$. The outputs $r_1$ to $r_6$ of storage units $SE_1$ and $SE_2$ are fed to the switch elements $KA_5$ to $KA_7$, whose output quantities $s_1$ to $s_3$ correspond to the sign product of the input impulses. The control voltages are now fed to the various steps of the delay line $VE_2$, for example, in the manner represented in FIG. 7. Thus, for example, the feeding of the impulses from the first to the second step in $VE_2$ can be stopped temporarily by the control impulse $s_1$. But it is also possible, for example, to reverse the polarity of the impulse signal fed to the fifth step by $s_2$. These control signals thus effect a change in the impulse sequence progressing in the delay line $VE_2$. Because of the impulse storage appearing in storage units $SE_1$ and $SE_2$, impulses of the fed control signal $u$ are determinant for these additional changes which precede the input signal $u_n$ of $VE_2$ in time by a great and constantly varying number of impulse intervals. The output signals $v$, finally obtained by the further camouflaging process, depend therefore, in contrast to the dependence shown in FIG. 3, on many variation impulses preceding far in time, as it was shown by way of example in FIG. 4. The secrecy is thus considerably increased by the additional effect of these control signals. The further processing of the permuted tap signals $p_7$ to $p_{12}$ of $VE_2$ is effected over the switch elements $KA_3$ and $KA_4$ as well as the storage devices $SE_3$ and $SE_4$ in a manner which has already been described, and the output impulses of $SE_3$ and $SE_4$ yield finally, by forming the sign products in the switch elements $KA_8$ to $KA_{10}$, the code signals $v_1$, $v_2$, $v_3$. By storing the impulses again by varying times in $SE_3$ and $SE_4$, a further increase of the coding security is achieved.

Figure 13:
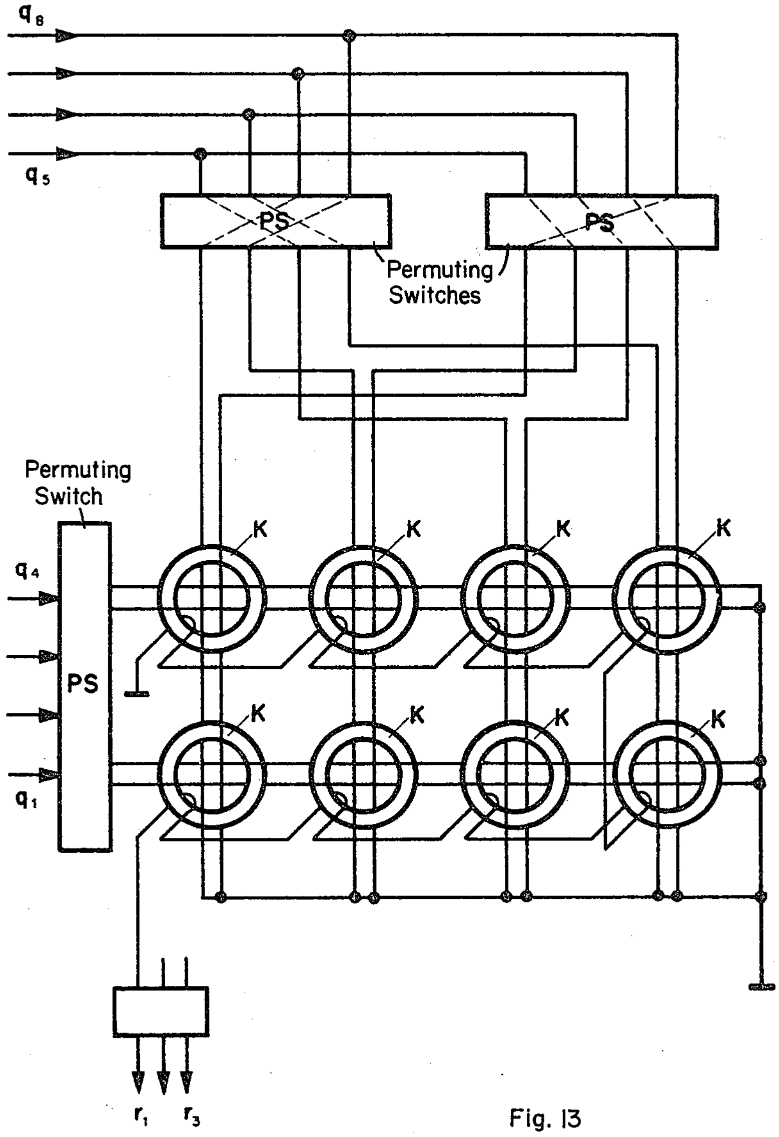

The construction of a storage device can be seen from FIG. 13. The signals $q_1$ to $q_4$ and $q_5$ to $q_8$ can be interchanged selectively in permuting switches PS and lead then through the ferrite cores K with rectangular magnetization curve. The magnetic reversal of the cores is effected only when an impulse acting in the direction of magnetization appears at the same time in a horizontal as well as in a vertical exciter line. One of the impulses $q_1$ to $q_4$, in connection with one of the impulses $q_5$ to $q_8$ produces a magnetic reversal of one of the eight cores K. In the common secondary circuit of all cores, a corresponding positive or negative output impulse $r_1$ is then generated. Additional secondary circuits, (not represented) are laid through the cores partly in opposite direction, so that at the same time additional output impulses $r_1$ to $r_3$ are formed which are associated with the individual cores with partly different signs. Instead of the magnetic storage elements, other storage elements which are known in themselves can naturally also be provided and numerous variations and additions are naturally possible in the combination of the various circuits.

The various delay devices VE mentioned above can also be obtained by using magnetic storage units, the respective stored binary quantity being fed to the next storage unit by special control impulses which appear at the same time as the impulses of the variation signal. Instead, the individual units can also be formed from dependent sweep circuits whose switching state is fed from step to step. Between the individual steps can be provided reversing circuits whose control is effected by the separately produced auxiliary signals $s$ mentioned above. The delay can finally also be effected by means of delay devices with moving carriers which are known in themselves, for example, with uniformly magnetic sound carriers, which are arranged rotatably opposite a recording head, several pickup heads and an erasing head. The delay time can then be varied at will in a simple manner by shifting the pickup heads.

I claim:

1. Secret signaling apparatus comprising a first pulse series modulated by an intelligence signal, means generating at a transmitting station a control pulse series of arbitrarily varying polarity, means converting said control pulse series into an additional pulse series at said transmitting station comprising logical circuit means with output pulses having polarities in dependence upon the polarities of several previously occurring pulses of said control pulse series, means combining said first pulse series with said additional pulse series of varying polarity at said transmitting station to form a composite pulse series, means for transmitting both said control pulse series and said composite pulse series from said transmitting station to a receiving station, means at said receiving station identical with those at said transmitting station for producing a second and identical additional pulse series, and means applying said second additional pulse series to said composite pulse series at said receiving station to reconvert the latter into said first pulse series.

2. Secret signaling apparatus as defined in claim 1 wherein said control pulse series and said additional pulse series are pulse series with equidistant pulses of different polarity but with equal amplitude.

3. Secret signaling apparatus as defined in claim 1 wherein said logical circuit means comprise an electronic digital computer.

4. Secret signaling apparatus as defined in claim 1 wherein said means for converting said control pulse series into said additional pulse series comprise a delay line having a plurality of taps and which is connected to said generating means for said control pulse series, and circuit components connected to said taps for forming said additional pulse series.

5. Secret signaling apparatus as defined in claim 4 and which further includes permuting switches in the lines from the taps on said delay line.

6. Secret signaling apparatus as defined in claim 4 and which further includes a storage unit in the lines from the taps on said delay line.

7. Secret signaling apparatus as defined in claim 4 and which further includes permuting switches and storage units in the lines from the taps on said delay lines.

References Cited in the file of this patent

UNITED STATES PATENTS 2,405,500 Guanella ---------------- Aug. 6, 1946